April 28, 1931.   R. W. McNEILL   1,802,770
CONTROL SYSTEM
Filed June 8, 1928
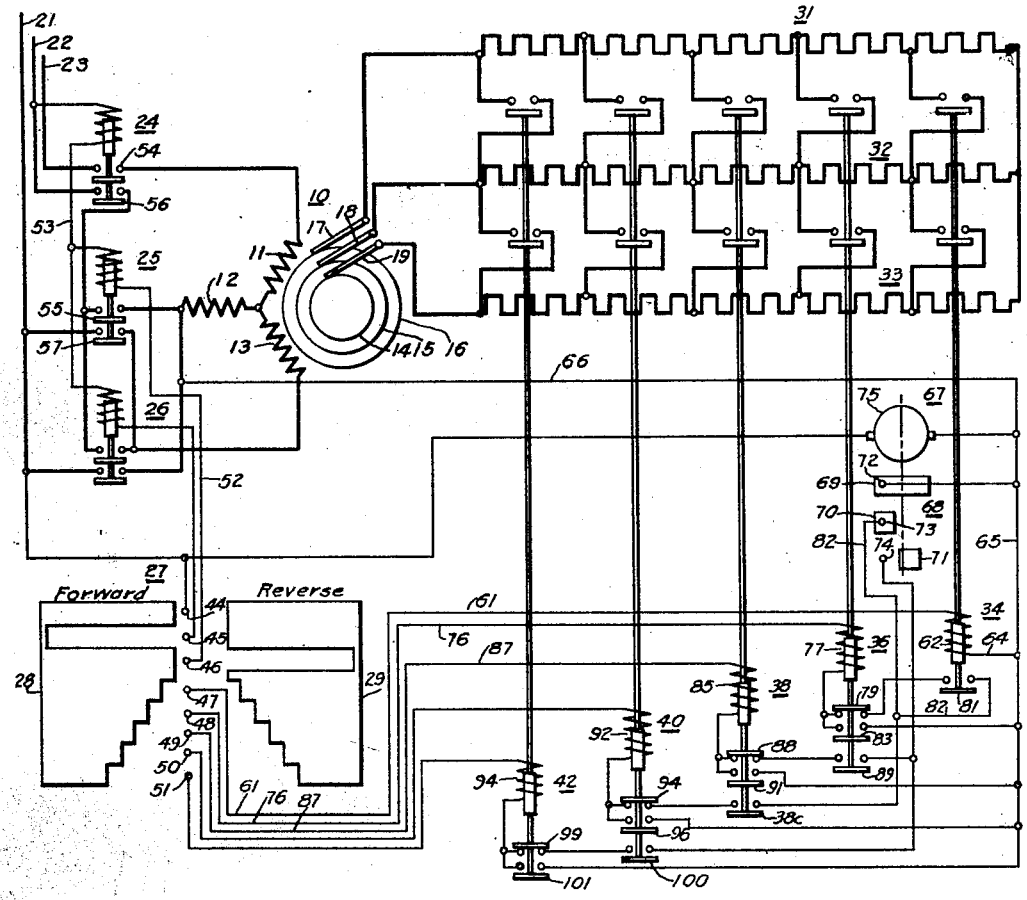
INVENTOR
Ralph W. McNeill
BY
ATTORNEY Patented Apr. 28, 1931

1,802,770

UNITED STATES PATENT OFFICE

RALPH W. McNEILL, OF DENVER, COLORADO, ASSIGNOR TO WESTINGHOUSE ELECTRIC & MANUFACTURING COMPANY, A CORPORATION OF PENNSYLVANIA

CONTROL SYSTEM

Application filed June 8, 1928. Serial No. 283,751.

My invention relates, generally, to motor-control systems and more particularly to control systems for electric motors of the variable-speed type which may be utilized for the operation of hoists and the like.

In the operation of motor-driven hoists, where the motor may be subjected to widely varying loads and heavy over-loads, it is desirable to employ a control system which will subject the motor to the minimum amount of abuse by preventing the continuous application of heavy over-loads, and forced acceleration under operating conditions which, in their severity, would shorten the life of the motor.

The object of this invention, generally stated, is to provide a control system for hoist motors which shall be simple and efficient in operation and readily and economically manufactured.

A more specific object of the invention is to provide for accelerating electric motors in successively occurring steps, with a definite time interval or delay between successive steps.

A further object of the invention is to provide for varying the quantity of accelerating resistance in an electric-motor circuit in a predetermined sequence, with a definite time delay occurring between successive variations.

Another object of the invention is to provide for manually controlling the initial acceleration of an electric motor and then automatically controlling the rate of acceleration during the remaining part of the accelerating period.

Another object of the invention is to provide for so shunting the accelerating resistor of an electric motor that the resistance may be decreased in steps, occurring in a predetermined sequence, with a definite time delay between successive steps, and increased at a rate determined by the operation of a master switch.

Other objects of the invention will become evident from the following description, taken in conjunction with the accompanying drawing in which:

The single figure is a diagrammatic view of a motor-control system embodying the principal features of my invention.

Referring now to the drawing, 10 designates, generally, an alternating-current motor of any suitable type for operating hoists. In this particular instance, a three-phase, wound-rotor induction motor is utilized. As illustrated, the motor 10 is provided with a three-phase stator or primary winding, the separate phase windings of which are designated as 11, 12 and 13, respectively, and a wound-rotor or secondary winding, indicated by the slip rings 14, 15 and 16, and brushes 17, 18 and 19, in the usual manner.

The motor may be energized from any suitable source of power which, in this particular instance, is illustrated as line conductors 21, 22 and 23.

In order to control the direction of rotation of the motor 10, a plurality of electrically operated switches 24, 25 and 26 are provided. As shown, the switch 24 is disposed to connect the phase winding 11 directly to the line conductor 23 for either direction of motor operation, while the switches 25 and 26 are disposed to be alternately employed, in conjunction with the switch 24, to reverse the connections between the phase windings 12 and 13 and thereby reverse the direction of rotation of the motor in accordance with a well known practice.

In this system, the operation of the motor 10 is controlled by means of a master switch 27 which may be of any suitable type. In this instance, a drum-type switch is provided and, as illustrated, carries contact segments 28 and 29 which, upon their operation, effect the closure of the proper directional switches to control the operation of the motor in the manner hereinbefore described.

In order to provide for accelerating the motor, a plurality of resistors 31, 32 and 33 are connected to the secondary windings of the motor 10, through the slip rings 17, 18 and 19, as shown.

It will be readily understood that any number of steps of acceleration may be obtained by providing the proper number of switches for short circuiting or shunting different sections of the resistors. In this particular system, a five-step acceleration system is shown for the purpose of illustration only, and it is to be understood that any desired number of steps may be employed in connection with this control system.

In order to vary the resistance in the secondary circuit of the motor 10 and thereby limit the current flowing therein during the starting and accelerating period, a plurality of electrically-operated switches 34, 36, 38, 40 and 42, is utilized. Each of the switches 34, 36, 38, 40 and 42, is provided with two contact members to short-circuit corresponding equal parts of the three resistors in order to maintain balanced currents in the secondary circuits of the motor 10.

In the operation of the system, the motor 10 may be connected to the source of power by actuating the master switch 27 to either the "forward" or the "reverse" operating position. Assuming that the master switch 27 is actuated to the first position, in the forward direction, the fixed contact fingers 44 and 46 are bridged by the movable segment 28 to establish an operating circuit for the directional switches 24 and 25. This switch-actuating circuit may be traced from the line conductor 21, through contact members 44 and 46, bridged by the movable segment 28, conductor 52, operating coil of the switch 25, conductor 53 and the operating coil of the switch 24, to the line conductor 22. It will be observed that, upon the closure of the switches 24 and 25, the phase winding 11 of the motor 10 is connected to the line conductor 23 through contact members 54 of the switch 24; the phase winding 12 is connected to the line conductor 22 through contact members 55 and 56 of switches 25 and 24, respectively, and phase winding 13 is connected to line conductor 21 through the contact member 57 of the switch 25.

When starting the motor, the operating coils of the resistor-shunting switches are deenergized and, therefore, the switches stand in their open positions, and the resistors 31, 32 and 33 are connected in the secondary circuit of the motor.

When utilizing motors of this type for hoisting service, it is desirable to positively control the first steps of acceleration by some manually operated means, such as a master switch. In this embodiment of the invention, the operating coil of the shunting switch 34 is disposed to be energized when the master switch 27 is actuated to the second operating position, in either the forward or the reverse direction. Accordingly, in order to reduce the secondary resistance, the master switch 27 is actuated to its second position, in the forward direction, to engage the fixed contact finger 47, when current will flow, from the line conductor 21, through contact fingers 44 and 47, bridged by the movable segment 28, conductors 61, operating coil 62 of the bridging switch 34, conductors 64, 65 and 66 and contact members 55 and 56 of the directional switches 25 and 24, to the line conductor 22. Upon the closure of the switch 34, the first section of each of the resistors 31, 32 and 33 is shunted.

In order to facilitate further acceleration of the motor, provision is made for automatically controlling the operation of the other shunting switches in response to a prior operation of the master switch 27. It will readily be understood that, if the operation of the resistor-shunting switches was positively controlled by the master switch 27, the rate at which the resistance of the secondary circuit could be varied would be entirely controlled by the operator, which, in many cases, would result in forced acceleration.

In order, therefore, to limit the rate at which the motor may be accelerated, regardless of the rate at which the master switch is actuated, provision is made for successively energizing the shunting switches in a predetermined sequence, with a definite time delay occurring between the operation of successive switches.

In this particular instance, a rotary timing mechanism, designated generally at 67, is utilized for controlling the operation of the shunting bridging switches. The timing mechanism is provided with a rotatable drum member 68 having movable contact segments 69, 70 and 71 which are disposed to engage a plurality of fixed contact fingers 72, 73 and 74, when the drum is rotated. The drum member 68 may be operated by means of any suitable motor, preferably, a motor which may be operated at a predetermined constant speed.

In this embodiment of the invention, the drum 68 is disposed to be driven by an electric motor 75 which is energized only when the motor 10 is connected to the source of power. Therefore, the timing mechanism 67 operates continuously when the motor 10 is operating and is always available for controlling the operation of the resistor-shunting switches when it is necessary to reverse the direction of operation of the hoisting motor or alternately increase and decrease its operating speed.

In order to render the timing mechanism 67 effective in controlling the operation of the shunting switches, after the first step of acceleration has been completed, the master switch 27 is operated to the third forward position to engage the fixed contact finger 48. It will be observed that current then flows from the line conductor 21, through fixed contact fingers 44 and 48, bridged by the movable segment 28, conductor 76, operating coil 77 of the shunting switch 36, contact members 79 of switch 36 and contact member 81 of switch 34, which is now in the closed position, conductor 82, fixed contact fingers 73 and 72 of the timing mechanism 67, to the conductor 66. Accordingly, the resistor-shunting switch 36 is closed, and a second portion of the resistors 31, 32 and 33 is shunted. The contact members 81, carried by the switch 34, are closed when the master switch 27 is actuated to effect the closure of the first shunting switch 34, and, therefore, they remain closed during the acceleration of the motor. It will be observed that the switch 36 is provided with normally open contact members 83 which are closed when the switch is actuated to its closed position. This provides for establishing a holding circuit for the switch 36 after the initial energizing circuit, established through the timing mechanism, is interrupted as the movable segment 70 of the rotatable drum 68 is disengaged from the contact finger 73.

It will be readily understood that the master switch 27 must be set in a predetermined position before the operation of the timing mechanism 67 will be effective in controlling the operation of the switches 36, 38, 40 and 42. Therefore, if the operator wishes to shunt the entire secondary resistance, it is necessary to actuate the master switch to the full operating position, in either the forward or the reverse direction, whereby the closure of the resistor shunting switches is controlled entirely by the operation of the timing mechanism 67.

With a view to clearly describing the operation of the timing mechanism 67, it may be assumed that the master switch 27 is actuated forwardly to engage the contact finger 51, thereby establishing certain contacts which are required for effecting the acceleration of the motor, then the actuating circuits for switches 36, 38, 40 and 42, are alternately completed by the operation of the timing mechanism 67, as hereinbefore described.

When the fixed contact member 49 is engaged by the movable segment 28, the operating coil 85 of the bridging switch 38 is energized through a circuit extending from the line conductor 21, contact fingers 44 and 49, bridged by the movable segment 28, through the conductor 87, coil 85, contact member 88 of the switch 38, contact members 89 of the closed switch 36, fixed contact fingers 74 and 72 of the timing mechanism 67, bridged by the movable contact segments 71 and 69, after the drum 68 has rotated a predetermined amount, to the energized conductor 66. Accordingly, when the switch 38 is actuated to its closed position, the contact member 88 is actuated to its open position and the contact member 91 to its closed position to establish a holding circuit for the switch 38 after the contact member 74 is disengaged by the movable segment 71.

It will be readily understood that continued operation of the remaining switches 40 and 42, is automatically effected in response to the operation of the timing mechanism 67, which is rotated to cause the engagement of the fixed contact finger 73 by the movable segment 70, which establishes an energizing circuit for the actuating coil 92 of the next shunting switch, 40. Further, within a predetermined time interval, the timing mechanism effects the operation of the shunting switch 42, as the movable contact segment 71 engages the fixed contact finger 74, thereby establishing an energizing circuit for the actuating coil 94 of the bridging switch 42, which, upon its closure, entirely shunts the accelerating resistors.

As described hereinbefore, the establishment of the operating circuits for the resistor-shunting switches depends primarily upon the operation of the master drum 27, the timing mechanism 67 being utilized for momentarily completing the operating circuits subsequent to the operation of the master drum. The circuits thus completed are maintained through the operation of auxiliary contact members carried by the bridging switches. Therefore, it will be readily understood that the shunting switches may be quickly deenergized by actuating the master drum 27 to the "off" position, to effect the deceleration of the motor to any desired degree.

The point at which the deceleration may be stopped depends upon the position of the master switch, and, from this point, the motor may again be accelerated in exactly the manner described hereinbefore, since the timing mechanism 67 is operating continuously and is disposed to automatically complete the energizing circuit for any number of shunting switches which may be selected by setting the master switch in the desired operating position.

It may be stated in conclusion that, while the illustrated example constitutes a practical embodiment of my invention, I do not wish to limit myself strictly to the exact details herein illustrated, since modifications of the same may be made without departing from the spirit of the invention as defined in the appended claims.

I claim as my invention:

1. In a control system for motors, in combination, an alternating-current motor having a wound rotor, a plurality of resistors connected to the rotor winding for controlling the acceleration of the motor, and means for varying the quantity of resistance in the rotor circuit, said means including a plurality of electro-magnetically operated switches for shunting parts of the resistors, energizing circuits for said switches, a controller disposed, when operated, to prepare the energizing circuits for operating said switches, and motor-operated means for finally completing the switch-energizing circuits to effect the operation of the switches in a predetermined sequence.

2. In a motor-control system, in combination, a motor, a source of power for the motor, directional switches for connecting the motor to the source of power, a master switch for controlling the operation of the directional switches, resistors for controlling the acceleration of the motor, switches for shunting different sections of the resistors, operating circuits for the switches, said master switch being further operable to partially complete the switch-operating circuits, and motor-actuated means for finally completing the switch-operating circuits to control the operation of the switches in a predetermined sequence, with a definite time delay in such operation.

3. In a motor-control system, in combination, a motor, accelerating resistors for the motor, switches for controlling the direction of operation of the motor, electro-magnetically operated switches for shunting predetermined sections of the accelerating resistors, a master switch for controlling the operation of the directional switches, and a motor-operated timing device responsive to the closure of the directional switches for controlling the operation of the resistor-shunting switches, said motor-operated timing device being operative to function in conjunction with the master switch in effecting the operation of the resistor-shunting switches thereby to provide a predetermined time interval between successive operations of the switches when the master switch is actuated above a predetermined rate.

4. In a motor-control system, in combination, a motor, resistors for controlling the acceleration of the motor, a plurality of switches for shunting the resistors, in steps, to accelerate the motor, energizing circuits for said switches, manually operable means for effecting the closure of predetermined switches to initiate the acceleration of the motor, means automatically operable in response to the energization of the motor for effecting the operation of the remaining switches to continue the acceleration of the motor, said automatic means being dependent upon the concurrent operation of said manually operable means, to render the energizing circuits for said remaining switches effective.

5. In a motor-control system, in combination, a motor, resistors for controlling the acceleration of the motor, a plurality of switches for shunting the resistors, in steps, to accelerate the motor, manually operable means for effecting the closure of predetermined shunting switches to initiate the acceleration of the motor, said manually operable means being disposed to set up separate operating circuits for certain groups of the remaining shunting switches, and motor-driven means disposed to be operated at a predetermined speed for controlling the energization of said operating circuits to cause the said switches to close at predetermined intervals, and means actuated by the switches to effect their closure in a definite sequence.

6. In a motor-control system, in combination, a motor, resistors for controlling the acceleration of the motor, a plurality of switches for shunting the resistors in steps, to accelerate the motor, manually operable controller for effecting the closure of predetermined switches to initiate the acceleration of the motor, said controller being further operable to prepare operating circuits for the remaining switches, means actuated by each shunting switch for further preparing said circuits, automatically operable for closing the remaining switches, and continuously operating means cooperative with the controller and switch-actuated means for causing a time-element operation of the different switches.

7. In a motor-control system, in combination, a motor, accelerating resistors for the motor, switches for shunting different sections of the resistors, operating circuits for the switches, switches for controlling the direction of operation of the motor, a master switch having a drum for controlling the directional switches, and for cooperating in the control of the shunting switches, and a motor-driven auxiliary drum switch provided with a plurality of contact segments disposed to effect the actuation of the shunting switches in response to the presetting of the master switch in a predetermined operating position to prepare a definite number of operating circuits for the shunting switches, thereby to insure the successive closure of a definite number of resistor-shunting switches at predetermined time intervals, while the master switches remains stationary.

8. In a motor-control system, in combination, a main motor provided with a phase-wound rotor winding, a plurality of accelerating resistors connected to the rotor windings, switches disposed to simultaneously short circuit equal parts of the resistors in each phase circuit, and a continuously rotating switch for regulating the operation of said switches, said rotating switch being provided with a contact-making drum and a constant-speed motor for actuating the drum whenever the main motor is energized, to provide for decreasing the accelerating resistance, step by step, with a predetermined time delay between successive steps.

9. In a motor-control system, in combination, a motor, accelerating resistors for the motor, switches for shunting different sections of the resistors, said switches being provided with actuating coils, a master switch for controlling the operation of the motor, said master switch having a drum member which, when operated, establishes actuating circuits for certain of said resistor-shunting switches and prepares energizing circuits for others, thereby shunting a portion of the accelerating resistors, and a continuously rotating contactor device for finally energizing the other of said shunting switches, said rotary contact device comprising a rotatable drum member having a plurality of make and break contact member for alternately operating the switches as the drum rotates.

10. In a motor-controlled system, in combination, a motor, accelerating resistors for the motor, switches for shunting different sections of the resistors, said switches being provided with auxiliary contact members, a master switch for positively controlling a plurality of the switches, and means disposed to control other of said switches in conjunction with the master switch, said means having continuously rotating contact members disposed to be connected in series relation with a normally closed auxiliary contact member and a normally open contact member of any two adjacent switches to insure that the switch which is actuated first is in its closed position before the next succeeding switch is energized.

11. In a control system for motors, in combination, a motor, resistors for controlling the acceleration of the motor, a plurality of switches for shunting different sections of the resistors, means for controlling the operation of said switches to effect their operation in a predetermined sequence, said means comprising a master switch disposed to be set in a plurality of operating positions to prepare operating circuits for the switches and means operable to complete each switch operating circuit subsequent to the establishment of said circuit by the master switch, and means responsive to the operation of the shunting switches for maintaining said switch-operating circuits energized to render the deenergization of the shunting switches completely under the control of the master switch, to decelerate the motor.

In testimony whereof, I have hereunto subscribed my name this 29th day of May, 1928.
RALPH W. McNEILL.